(12) United States Patent
Kim et al.

(10) Patent No.: US 9,816,685 B2
(45) Date of Patent: Nov. 14, 2017

(54) PRESSURE-SENSITIVE ADHESIVE COMPOSITION

(75) Inventors: Woo Ha Kim, Daejeon (KR); Se Woo Yang, Daejeon (KR); Suk Ky Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 296 days.

(21) Appl. No.: 13/883,954

(22) PCT Filed: Nov. 8, 2011

(86) PCT No.: PCT/KR2011/008446
§ 371 (c)(1),
(2), (4) Date: May 7, 2013

(87) PCT Pub. No.: WO2012/064071
PCT Pub. Date: May 18, 2012

(65) Prior Publication Data
US 2013/0224436 A1    Aug. 29, 2013

(30) Foreign Application Priority Data

Nov. 8, 2010 (KR) .................. 10-2010-0110587
Nov. 8, 2011 (KR) .................. 10-2011-0115590

(51) Int. Cl.
*C09J 133/14* (2006.01)
*C09J 7/02* (2006.01)
(Continued)

(52) U.S. Cl.
CPC ............ *F21V 11/00* (2013.01); *C08F 220/06* (2013.01); *C08F 220/18* (2013.01); *C08F 220/20* (2013.01); *C08F 220/28* (2013.01); *C09J 4/00* (2013.01); *C09J 7/0207* (2013.01); *C09J 7/0246* (2013.01); *C09J 133/14* (2013.01);
(Continued)

(58) Field of Classification Search
CPC . C09J 4/00; C09J 7/0207; C09J 7/0217; C09J 7/0246; C09J 133/14; C09J 133/08; C09J 133/10; C09J 133/12; C09J 2203/318; C09J 2433/00; C08F 220/06; C08F 220/18; C08F 220/1808; C08F 220/1816; C08F 220/1825; C08F 220/1833; C08F 220/1841; C08F 220/185; C08F 220/1858; C08F 220/1866; C08F 220/1875; C08F 220/1883; C08F 220/1891; C08F 220/20; C08F 220/28; Y10T 428/24355
See application file for complete search history.

(56) References Cited

U.S. PATENT DOCUMENTS

2005/0277729 A1* 12/2005 Tsunemine et al. .......... 524/558
2006/0057366 A1*  3/2006 Husemann ............ C09J 133/06
                                                           428/343

(Continued)

FOREIGN PATENT DOCUMENTS

CN       1303423 A      7/2001
CN     101081968 A    12/2007
(Continued)

*Primary Examiner* — Nancy R Johnson
(74) *Attorney, Agent, or Firm* — Dentons US LLP

(57) ABSTRACT

Provided is a pressure-sensitive adhesive composition. The pressure-sensitive adhesive composition may be applied as a light diffusing or scattering material to various display devices or lighting apparatuses.

13 Claims, 3 Drawing Sheets

(51) Int. Cl.
*F21V 11/00* (2015.01)
*C09J 4/00* (2006.01)
*C08F 220/06* (2006.01)
*C08F 220/18* (2006.01)
*C08F 220/20* (2006.01)
*C08F 220/28* (2006.01)

(52) U.S. Cl.
CPC ...... *C09J 2203/318* (2013.01); *C09J 2433/00* (2013.01); *C09J 2467/006* (2013.01); *Y10T 428/24355* (2015.01)

(56) References Cited

U.S. PATENT DOCUMENTS

| | | | |
|---|---|---|---|
| 2007/0025121 A1* | 2/2007 | Harada et al. | 362/607 |
| 2007/0264499 A1 | 11/2007 | Choi et al. | |
| 2009/0246516 A1 | 10/2009 | Murayama et al. | |
| 2010/0048804 A1* | 2/2010 | Determan | C09J 133/08 524/555 |
| 2010/0227969 A1* | 9/2010 | Zhu et al. | 524/560 |

FOREIGN PATENT DOCUMENTS

| | | |
|---|---|---|
| CN | 101544876 A | 9/2009 |
| CN | 101805573 A | 8/2010 |
| EP | 1602700 A1 | 12/2005 |
| EP | 1862494 A1 | 12/2007 |
| JP | 2008013746 | 1/2008 |
| JP | 2008503638 | 2/2008 |
| JP | 2008-297419 | 12/2008 |
| JP | 2009-84400 A | 4/2009 |
| JP | 2009-209329 | 9/2009 |
| JP | 2009-249602 | 10/2009 |
| JP | 2010-100857 | 5/2010 |
| JP | 2010-195971 | 9/2010 |
| KR | 10-2003-0006949 | 1/2003 |
| KR | 10-2003-0059726 | 7/2003 |
| KR | 20030059726 | 7/2003 |
| KR | 1020030059726 A | 7/2003 |
| KR | 10-2004-0049280 A | 6/2004 |
| KR | 10-0628106 | 9/2006 |
| KR | 10-0820175 | 4/2008 |
| KR | 10-2009-0103756 | 10/2009 |
| TW | 200944566 | 11/2009 |
| TW | 201006900 | 2/2010 |

* cited by examiner

PRESSURE-SENSITIVE ADHESIVE COMPOSITION

This application is a National Stage Entry of International Application No. PCT/KR2011/008446, filed Nov. 8, 2011, and claims the benefit of Korean Patent Application No. 10-2010-0110587, filed on Nov. 8, 2010, and 10-2011-0115590, filed Nov. 8, 2011, all of which are hereby incorporated by reference in their entirety for all purposes as if fully set forth herein.

BACKGROUND

1. Field of the Invention

The present invention relates to a pressure-sensitive adhesive composition.

2. Discussion of Related Art

Light emitted from a surface of an apparatus such as a TV, a monitor, a gaming apparatus or a mobile phone has a direct influence on brightness of a screen. In addition, improving luminance of a light source is an important issue with regard to contrast. The luminance of a light source also has a direct influence on the brightness of a lighting apparatus. In addition, when the luminance of the light source is increased in an optical or lighting apparatus, a current amount to be used may be reduced.

To uniformly emit light from a light source, new light guide plates and diffuser sheets or plates are being designed, and research on the shape or arrangement of a light source such as a cold cathode-ray tube or light emitting diode, or a means for inducing emission using low power is underway. In addition, there have been attempts to improve a luminance by disposing an optical diode such as a diffuser plate or retro reflective plate above a light source or light guide plate.

In a structure of a light source such as a back light unit, generally, a diffuser plate is simply placed above a light source or light guide plate. Thus, an air gap is present between the light source or light guide plate and the diffuser plate. The air gap induces the loss of emitted light. Accordingly, there have been attempts to give a diffusion function through surface treatment to the light guide plate, or remove the air gap using matching oil.

However, during the process of giving the diffusion function to the light guide plate, process efficiency is greatly decreased and it is difficult to coordinate with a change in product size. When the matching oil is used, liquid leakage also occurs due to heat of the light source itself.

As the diffuser plate, a hard-type material, for example, based on poly(methyl methacrylate) (PMMA) or polycarbonate (PC) is used. However, the material curls easily under severe conditions such as high temperature or high temperature and humidity conditions, and has a limit in its application to manufacture of a flexible device. Moreover, a plastic material releases moisture, a solvent or other liquid additives contained therein in a gas state, which is generally called "out-gassing." Due to such a phenomenon, the released gas generates bubbles and thus induces degradation in optical properties.

SUMMARY OF THE INVENTION

The present invention is directed to a pressure-sensitive adhesive composition.

In one aspect, a pressure-sensitive adhesive composition is provided. The exemplary pressure-sensitive adhesive composition includes a monomer or polymer component, and a dye.

In one example, the monomer component may include a compound represented by any one of Formulas 1 to 3, and the polymer component may have the monomer component including a compound represented by any one of Formulas 1 to 3 as a polymerization unit.

Herein, the expression "a polymer component has a predetermined component as a polymerization unit" may indicate a state in which the predetermined component is involved in polymerization to form the polymer component, thereby forming a backbone such as a main or side chain of the polymer component after the polymerization. In addition, the term "polymer" includes all compounds prepared by polymerizing at least two monomers or monomer components. Thus, for example, the polymer may also include a material referred to as an oligomer.

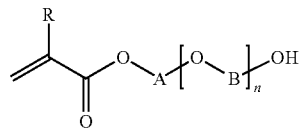

[Formula 1]

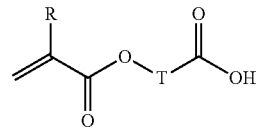

[Formula 2]

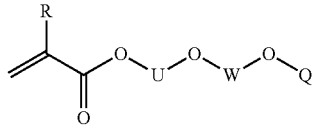

[Formula 3]

In Formulas 1 to 3, R is hydrogen or an alkyl group, A, B, T, U and W are each independently an alkylene or alkylidene group, Q is an alkyl or aryl group, and n is a number of 0 to 5.

Herein, the term "alkyl group" may mean an alkyl group having 1 to 20, 1 to 16, 1 to 12, 1 to 8 or 1 to 4 carbon atoms, unless specifically defined otherwise. The alkyl group may have a linear, branched or cyclic structure, or may be substituted by at least one substituent, or unsubstituted.

Herein, the term "alkylene or alkylidene group" may be a linear, branched or cyclic substituted or unsubstituted alkylene or alkylidene group having 1 to 20, 1 to 16, 1 to 12, 1 to 8 or 1 to 4 carbon atoms, unless specifically defined otherwise.

Herein, the term "aryl group" may mean a monovalent moiety derived from a compound or derivate thereof including a structure in which benzene is included or at least two benzenes are condensed or bound to each other, unless specifically defined otherwise. For example, the aryl group may have 6 to 22, 6 to 16 or 6 to 13 carbon atoms, and may be, for example, a phenyl, phenylethyl, phenylpropyl, benzyl, tolyl, xylyl or naphthyl group.

Herein, a substituent which may be substituted to a specific functional group may be, but is not limited to, a halogen atom, a hydroxyl, carboxyl, thiol, alkyl, alkoxy, alkenyl, epoxy, cyano, carboxyl, acryloyl, methacryloyl, acryloyloxy, methacryloyloxy or aryl group.

In Formula 1, n may be one of 0 to 3, and preferably one of 0 to 2.

A compound of Formula 1 may be, but is not limited to, 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate or 2-hydroxypropyleneglycol (meth)acrylate.

In Formula 2, T may be an alkylene group having 1 to 4 carbon atoms, and a compound of Formula 2 may be β-carboxyethyl(meth)acrylate.

In addition, in a compound of Formula 3, Q is an alkyl group having 1 to 4 carbon atoms, and U and W may each be independently an alkylene group having 1 to 4 carbon atoms. The compound of Formula 3 may be, but is not limited to, 2-(2-ethoxyethoxy)ethyl(meth)acrylate.

The monomer component may further include a (meth) acrylic acid ester monomer. Herein, the term "(meth)acryl" may mean acryl or methacryl. The (meth)acrylic acid ester monomer may be an alky(meth)acrylate, which may be an alky(meth)acrylate including an alkyl group having 1 to 20 carbon atoms such as methyl(meth)acrylate, ethyl(meth) acrylate, n-propyl(meth)acrylate, isopropyl(meth)acrylate, n-butyl(meth)acrylate, t-butyl(meth)acrylate, sec-butyl (meth)acrylate, pentyl(meth)acrylate, hexyl(meth)acrylate, 2-ethylhexyl(meth)acrylate, 2-ethylbutyl(meth)acrylate, n-octyl(meth)acrylate, isooctyl(meth)acrylate, isononyl (meth)acrylate, lauryl(meth)acrylate or tetradecyl(meth) acrylate.

In one example, the monomer component may include 50 to 99.9 parts by weight of a (meth)acrylic acid ester monomer and 0.1 to 50 parts by weight of the compound represented by any one of Formulas 1 to 3; 55 to 90 parts by weight of a (meth)acrylic acid ester monomer and 5 to 40 parts by weight of the compound represented by any one of Formulas 1 to 3; or 55 to 85 parts by weight of a (meth) acrylic acid ester monomer and 5 to 30 parts by weight of the compound represented by any one of Formulas 1 to 3.

Herein, unless specifically defined otherwise, the unit "part(s) by weight" means a weight ratio.

A weight ratio of the compound represented by any one of Formulas 1 to 3 may be modulated in consideration of an effect of preventing whitening, a handling property, process efficiency and storage stability of a pressure-sensitive adhesive. For example, when the compound of Formula 1 is included and the ratio is excessively increased, the storage stability of the pressure-sensitive adhesive may be decreased. In addition, when the compound of Formula 2 is included and the ratio is excessively increased, the process efficiency may be decreased due to heat generated during a process. When the weight ratio of the monomer of Formula 3 is excessively increased, the pressure-sensitive adhesive may be so soft that the handling property may be decreased. When the weight ratios of the compounds of Formulas 1 to 3 are excessively decreased, the whitening of the pressure-sensitive adhesive may not be effectively prevented. Accordingly, in consideration of such a problem, the weight ratio should be modulated.

In one example, the monomer component may further include (meth)acrylic acid to satisfy required properties for the pressure-sensitive adhesive, prevent the whitening phenomenon, and ensure durability.

For example, the (meth)acrylic acid may be included in an amount of 0.1 to 20, 0.1 to 15 or 1 to 15 parts by weight based on a different monomer component.

For example, the monomer component may include 50 to 99.9 parts by weight of a (meth)acrylic acid ester monomer, 0.1 to 20 parts by weight of (meth)acrylic acid and 0.1 to 40 parts by weight of one of the compounds of Formulas 1 to 3; 55 to 95 parts by weight of a (meth)acrylic acid ester monomer, 0.1 to 15 parts by weight of (meth)acrylic acid and 5 to 40 parts by weight of one of the compounds of Formulas 1 to 3; or 50 to 85 parts by weight of a (meth) acrylic acid ester monomer, 1 to 15 parts by weight of (meth)acrylic acid and 5 to 30 parts by weight of one of the compounds of Formulas 1 to 3. When a ratio of the (meth) acrylic acid is excessively low in the pressure-sensitive adhesive composition, an effect, for example, endurance of desired durability, may be insignificant, and when a ratio of the (meth)acrylic acid is excessively high, the process efficiency may be decreased due to high heat. Therefore, the ratio may be suitably selected in consideration of the above problems.

In an exemplary embodiment, the monomer component may include a (meth)acrylic acid ester monomer; (meth) acrylic acid or the compound of Formula 2; and the compound of Formula 1 or 3, and preferably a (meth)acrylic acid ester monomer; (meth)acrylic acid or the compound of Formula 2; and the compound of Formula 1. In this case, a weight ratio of the (meth)acrylic acid or the compound of Formula 2 may be modulated within a weight ratio of the (meth)acrylic acid, and the weight ratio of the compound of Formula 1 or 3 may be modulated within a range of a weight ratio of the compound represented by any one of Formulas 1 to 3.

In one example, the monomer component may further include a compound of the following Formula 4.

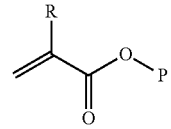

[Formula 4]

In Formula 4, R is hydrogen or an alkyl group, and P is a monovalent moiety derived from an aliphatic saturated cyclic hydrocarbon compound.

In Formula 4, the monovalent moiety may mean an aliphatic saturated cyclic hydrocarbon compound, and specifically a monovalent moiety derived from a compound or derivative thereof which is a compound having carbon atoms bound in a ring shape, not an aromatic compound. The aliphatic saturated cyclic hydrocarbon compound may have 3 to 20 carbon atoms, preferably 6 to 15 carbon atoms, and more preferably 8 to 12 carbon atoms. As the monovalent moiety, an isobornyl, cyclohexyl, norbornanyl, norbornenyl, dicyclopentadienyl, ethynylcyclohexane, ethynylcyclohexene or ethynyldecahydronaphthalene group may be used, and in one example, an isobornyl group may be used, but the present invention is not limited thereto.

The compound of Formula 4 may be included in a ratio of 0.1 to 50, 5 to 40 or 5 to 30 parts by weight, based on a different monomer component. For example, the monomer component may include 50 to 99.9 parts by weight of a (meth)acrylic acid ester monomer, 0.1 to 50 parts by weight of the compound of Formula 4 and 0.1 to 40 parts by weight of the compound represented by any one of Formulas 1 to 3; 55 to 95 parts by weight of a (meth)acrylic acid ester monomer, 5 to 40 parts by weight of the compound of Formula 4 and 5 to 40 parts by weight of the compound represented by any one of Formulas 1 to 3; or 50 to 85 parts by weight of a (meth)acrylic acid ester monomer, 5 to 30 parts by weight of the compound of Formula 4 and 5 to 30 parts by weight of the compound represented by any one of Formulas 1 to 3.

When the ratio of the compound of Formula 4 in the monomer component is excessively low, the effect of ensuring the durability may be insignificant, and when the ratio of the compound of Formula 4 is excessively high, an adhesive property of the pressure-sensitive adhesive may be degraded. Therefore, the weight ratio may be controlled in consideration of the above problems.

The monomer or polymer component may be a component forming a base of the pressure-sensitive adhesive after curing. The term "curing" may mean a process of expressing adhesive performance of the pressure-sensitive adhesive composition by a physical or chemical action or reaction of components included in the pressure-sensitive adhesive composition.

The monomer or polymer component may include the component described above, and may be present in various types when being cured to exhibit the adhesive property.

In one example, when the composition is a thermosetting type, the monomer or polymer component may be an acryl polymer having the monomer component as a polymerization unit. The acryl polymer may be a crosslinkable acryl polymer including a copolymerizable monomer providing a crosslinkable functional group known in the pressure-sensitive adhesive resin field as a polymerization unit. In addition, in this case, the pressure-sensitive adhesive composition may further include a multifunctional crosslinking agent which can crosslink the polymer. As the multifunctional crosslinking agent, a known crosslinking agent such as an isocyanate crosslinking agent, an epoxy crosslinking agent, an aziridine crosslinking agent or a metal chelate crosslinking agent may be used. In addition, a ratio of the crosslinking agent in the composition is not particularly limited, and may be suitably modulated according to a desired cohesive strength.

The pressure-sensitive adhesive composition may be a photocurable type. The term "photocurable pressure-sensitive adhesive composition" may mean a composition which can be converted into a pressure-sensitive adhesive by being cured by irradiation of electromagnetic waves. The electromagnetic waves may include microwaves, infrared rays, ultraviolet rays, X rays, gamma rays or particle beams such as alpha-particle beams, proton beams, neutron beams and electron beams, and UV rays or electron beams may be generally used.

When the pressure-sensitive adhesive composition is a photocurable type, the monomer or polymer component may include a photocurable oligomer and a reactive diluting monomer. In an example of the photocurable oligomer, all oligomer components used to prepare the photocurable, for example, UV-curable, pressure-sensitive adhesive composition may be included. For example, the oligomer may be, but is not limited to, a urethane acrylate such as a reaction product of polyisocyanate having at least two isocyanate groups in the molecule and hydroxyalkyl(meth)acrylate; an ester-based acrylate such as a dehydration-condensation reaction product of polyester polyol and (meth)acrylic acid; an ester-based urethane acrylate obtained by reacting an ester-based urethane resin which is a reaction product of polyester polyol and polyisocyanate with a hydroxyalkyl acrylate compound; an ester-based acrylate such as poly-alkyleneglycol di(meth)acrylate; an ester-based urethane acrylate obtained by reacting an ester-based urethane resin which is a reaction product of polyester polyol and polyisocyanate with a hydroxyalkyl(meth)acrylate; or an epoxy acrylate such as an addition-reaction product of an epoxy resin and (meth)acrylic acid.

In the above type of the composition, as the reactive diluting monomer, the compound represented by one of Formulas 1 to 4 or (meth)acrylic acid may be used. As the reactive monomer, a different monomer known in the art as a monomer further having a reactive functional group such as a (meth)acryloyl group may also be used. The different monomer may be, but is not limited to, an aryl-containing monomer such as alkyl(meth)acrylate, benzyl(meth)acrylate or phenoxyethyl(meth)acrylate; a heterocyclic moiety-containing monomer such as tetrahydrofurfuryl(meth)acrylate or (meth)acryloyl morpholine; or a multifunctional acrylate.

In addition, another type of the photocurable pressure-sensitive adhesive composition may include the above-described monomer components, for example, a (meth)acrylic acid ester monomer; and the compound represented by one of Formulas 1 to 3, and further include (meth)acrylic acid or a photocurable syrup which is a partially polymerized product of a monomer component including the compound of Formula 4 when necessary. That is, in this type, the monomer or polymer component may include the photocurable syrup. In addition, a compound included in the monomer component forming the syrup or a weight ratio of the compound in the component may be applied in the same manner as described above.

The monomer or polymer component may have a viscosity at 25° C. of 1,500 to 4,000 cps or 2,000 to 3,500 cps. When the viscosity is controlled within the above range, the process efficiency may be ensured and a physical property such as an adhesive property of the pressure-sensitive adhesive may be effectively maintained. A method of controlling the viscosity of the monomer or polymer component as described above is not particularly limited. For example, when the composition is the above-described thermosetting type, a method of controlling a solid content or molecular weight of the polymer or a diluting ratio thereof as a solvent may be used, and when the composition includes a photocurable oligomer and a reactive diluting monomer, a method of controlling the kinds or mixing ratio of the oligomer and monomer may be used. When the composition is a partially polymerized product of a monomer mixture, a method of controlling the weight ratio or polymerization ratio of each component in the partially polymerized product, that is, the monomer component forming the syrup, may be used.

The pressure-sensitive adhesive composition also includes a dye. The dye may inhibit yellowing or whitening of the pressure-sensitive adhesive. For example, when the pressure-sensitive adhesive composition is used in an optical use, particularly, a light diffusing or scattering use and a yellowing or whitening degree of the pressure-sensitive adhesive is increased, an entire display screen looks dull due to distortion of white light emitted from a light source, or the screen looks yellow and thus may be difficult to apply. The dye may prevent such whitening and yellowing phenomena.

A specific kind of the dye is not particularly limited, and thus a conventional organic dye used in coloring of plastic may be used. In one example, a nitroso dye, a nitro dye, an azo dye, a triphenylmethane dye, a phthalic anhydride dye, an indigo dye or an anthroquinone dye may be used. In one example, as a dye, a blue dye, for example, an anthraquinone-based dye, may be used. The dye may be, but is not limited to, one of MACROLEX series produced by Lanxess.

An amount of dye added is not particularly limited. For example, the dye may be included in an amount in order for b* and yellow index (YI) on the Commission internationale de l'éclairage (CIE) coordinate system of an entire pressure-sensitive adhesive to be in the following range in consideration of the yellowing or whitening degree of the pressure-sensitive adhesive. For example, when the pressure-sensitive adhesive excluding the dye exhibits or has a chance of having high yellowing and whitening degrees, a ratio of the dye is increased, and in the opposite case, a ratio of the dye is decreased to modulate a content of the dye for the b* and YI on the entire CIE coordinate system to be in the following range. Conventionally, the dye may be included in a concentration of 0.001 to 20 ppm, 0.001 to 10 ppm, 0.05 to 6 ppm, 0.1 to 4 ppm or 0.1 to 2 ppm, but the present invention is not limited thereto.

The pressure-sensitive adhesive composition exhibits an adhesive property in a cured state, and the b* value on the CIE coordinate system may be −2 to 3, −1 to 3, 0 to 3, 1 to 3 or 1.5 to 3. The b* value may be a value obtained right after the composition is prepared into a pressure-sensitive adhesive through a curing process, a value obtained right after the prepared pressure-sensitive adhesive undergoes a heat resistance test or a value obtained right after the prepared pressure-sensitive adhesive undergoes a humidity and heat resistance test. The b* values on the CIE coordinate systems may all be in the above range right after the pressure-sensitive adhesive is prepared, undergoes the heat resistance test and also undergoes the humidity and heat resistance test. The heat resistance test is to detect a state of the prepared pressure-sensitive adhesive after being left at 80° C. for 240 hours, and the humidity and heat resistance test is to detect a state of the prepared pressure-sensitive adhesive after being left at 60° C. and a relative humidity of 90% for 240 hours. The CIE coordinate system is a color value defined by the Commission internationale de l'éclairage, and is also referred to as a CIE color specification system or CIE color space. The coordinate system is a uniform color space coordinate system, which has a very small difference from colors seen by eyes, and thus is now standardized all over the world. The CIE coordinate system is defined by L* representing lightness, and a* and b* representing colors. Here, a* and b* show directions of colors. Specifically, when the value a* is a positive number, the color direction is red, and when the value a* is a negative number, the color is green. When the value b* is a positive number, the color is yellow, and when the value b* is a negative number, the color is blue. The value b* of the pressure-sensitive adhesive may be measured by a known method.

The composition may also have a yellow index (YI) in a cured state of −8.0 to 7.5, 0 to 7.5, 1 to 7.5, 2 to 7.5, 3 to 7.5, 4 to 7 or 5 to 7. Like the b* value, the YI value may be a value obtained right after the pressure-sensitive adhesive is prepared, a value obtained right after the pressure-sensitive adhesive undergoes the heat resistance test, or a value obtained right after the pressure-sensitive adhesive undergoes a humidity and heat resistance test. Preferably, the YI may all be in the above range right after the pressure-sensitive adhesive is prepared, undergoes the heat resistance test and undergoes the humidity and heat resistance test. Here, details of the heat resistance and humidity and heat resistance tests are described above.

When the b* and YI values of the pressure-sensitive adhesive are modulated, the pressure-sensitive adhesive which does not have whitening or yellowing and a maximized applicability to an optical use may be provided.

The pressure-sensitive adhesive composition may further include particles. The particles may be scattering particles. The term "scattering particles" means particles which may scatter or diffuse light incident to the pressure sensitive adhesive due to a different refractive index from the pressure-sensitive adhesive. In addition, in the definition of the relationship of the refractive index with the scattering particles, it is defined that the pressure-sensitive adhesive is formed by curing the above-described pressure-sensitive adhesive composition excluding the scattering particles.

In one example, the scattering particles may have a difference in refractive index from the pressure-sensitive adhesive of 0.05 to 1.0, 0.05 to 0.6 or 0.05 to 0.4. In one example, the particle may have a higher refractive index than the pressure-sensitive adhesive, and meet the above-described relationship. When the difference in refractive index is less than 0.05, a light scattering or diffusing effect of the pressure-sensitive adhesive may be insignificant, and when the difference in refractive index is more than 0.1, due to decreased transparency, the pressure-sensitive adhesive may be difficult to apply in an optical use.

A specific kind of the scattering particles is not particularly limited as long as the particles have good feasibility with a different component of the composition and scattering property. In addition, the shape of the particles is not limited either, and thus the particles may have any shape such as spherical, polyhedral or amorphous shape with no limit, and particularly a spherical shape. The spherical shape also includes a substantially or basically spherical shape as well as a perfectly spherical shape geometrically.

A specific example of the scattering particles may be, but is not limited to, beads formed of an organic material such as an acryl-based resin, a styrene resin, a urethane resin, a melamine resin, a benzoguanamine resin, an epoxy resin or a silicon resin; or beads formed of an inorganic material such as silica, titanium dioxide ($TiO_2$), magnesium fluoride ($MgF_2$), zirconium oxide ($ZrO_2$), aluminum oxide ($Al_2O_3$) or glass. The acryl-based resin, the styrene-based resin or the urethane-based resin described above may form beads in a crosslinked or non-crosslinked state. The scattering particles may be, but are not limited to, a benzoguanamine formaldehyde condensation product (Epostar M30: refractive index: 1.66), a melamine formaldehyde condensation product (Epostar, refractive index: 1.66) or a poly(methylmethacrylate) based crosslinked product (Epostar MX, refractive index: 1.49), which is produced by Nippon Shokubai; a crosslinked poly(methyl methacrylate) (MBX, refractive index: 1.49) or a crosslinked polystyrene (SBX, refractive index: 1.59), which is produced by Sekisui Chemical; a silicon resin (Toss Pearl, refractive index: 1.43) produced by Toshiba Silicon; an epoxy resin (Toray Pearl, refractive index: 1.59) produced by Toray; polystyrene-based beads (GS-04595-6, refractive index: 1.59) produced by Ganz; polystyrene resin-based beads (KSR-3, refractive index: 1.59) produced by Soken Chemical; or polystyrene-based beads (HR-59-40, refractive index: 1.59) produced by Sunjin Chemicals Co., Ltd.

The scattering particles may have an average particle diameter of approximately 1,000 nm to 30,000 nm, approximately 1,000 nm to 20,000 nm or approximately 1,000 nm to 10,000 nm. When the size of the scattering particle is excessively small, a light scattering or light diffusing effect may be degraded, and when the size of the scattering particle is excessively large, an adhesive property may be decreased.

A ratio of the scattering particles in the composition may be changed in consideration of a light scattering or diffusing property, but is not particularly limited. In one example, the particles may be included in 0.01 to 50 parts by weight, 0.1 to 40 parts by weight, 1 to 30 parts by weight, 5 to 20 parts by weight or 10 to 20 parts by weight with respect to 100 parts by weight of a monomer or polymer component. When the weight ratio of the scattering particles is excessively low, the light scattering or diffusing effect may be degraded, and when the weight ratio of the scattering particle is excessively high, an adhesive property may be decreased. Thus, in consideration of the above problems, the ratio may be modulated.

The pressure-sensitive adhesive composition may include a multifunctional acrylate as well as the above-described component when necessary. Particularly, the multifunctional acrylate may be included when the monomer or polymer component is the above-described photocurable syrup, but the present invention is not limited thereto. A kind of the multifunctional acrylate may be, but is not limited to, a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecane dimethanol(meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; or a hexafunctional acrylate such as dipentaerythritol hexa(meth)acrylate, caprolactone-modified dipentaerythritol hexa(meth)acrylate, or urethane(meth)acrylate (e.g. a reaction product of an isocyanate monomer and trimethylolpropane tri(meth)acrylate).

The multifunctional acrylate may be included in 0.05 to 50 parts by weight with respect to 100 parts by weight of a monomer or polymer component, but the weight ratio may be changed in consideration of process efficiency or properties of the pressure-sensitive adhesive.

The photocurable pressure-sensitive adhesive composition may further include a photoinitiator. A polymerization degree may be controlled according to an amount of the photoinitiator used herein. As the photoinitiator, any one that can initiate a polymerization reaction through light irradiation may be used. For example, as the photoinitiator, an α-hydroxyketone-based compound (e.g., Irgacure 184, 500 or 2959, or Darocur 1173, Ciba Specialty Chemicals), a phenylglyoxylate-based compound (e.g., Irgacure 754 or Darocur MBF, Ciba Specialty Chemicals), a benzyldimethylketal-based compound (e.g., Irgacure 651, Ciba Specialty Chemicals); an α-aminoketone-based compound (e.g., Irgacure 369, 907 or 1300, Ciba Specialty Chemicals); a monoacylphosphine-based compound (MAPO) (e.g., Darocur TPO, Ciba Specialty Chemicals); a bisacylphosphine oxide compound (BAPO) (e.g., Irgacure 819 or 819DW, Ciba Specialty Chemicals); a phosphineoxide-based compound (e.g., Irgacure 2100, Ciba Specialty Chemicals); a methalocene-based compound (e.g., Irgacure 784, Ciba Specialty Chemicals); an iodonium salt (e.g., Irgacure 250, Ciba Specialty Chemicals); or at least one mixture thereof (e.g., Darocur 4265, Irgacure 2022, 1300, 2005, 2010 or 2020, Ciba Specialty Chemicals) may be used. The pressure-sensitive adhesive composition may include at least one or two thereof, but the present invention is not limited thereto.

The photoinitiator may be included in the composition in an amount of 0.05 to 20 parts by weight with respect to 100 parts by weight of the monomer or polymer component described above, but the weight ratio may be changed in consideration of the process efficiency or properties of a cured product.

The composition may further include an antioxidant. The yellowing of the pressure-sensitive adhesive may be effectively inhibited by suitably mixing the antioxidant. A specific kind of the antioxidant is not particularly limited. Therefore, a conventional component known in the preparation of the pressure-sensitive adhesive (e.g., one of songnox series produced by Songwon Industrial Co., Ltd.: songnox 1010, songnox 1076, songnox 1135, songnox 1035, etc.) may be used as the antioxidant, and the content of the antioxidant may be suitably modulated in consideration of a desired property.

The pressure-sensitive adhesive composition may further include a reworkability improving agent. Due to the reworkability improving agent, workability and re-peelability may be improved when the pressure-sensitive adhesive is applied. A specific kind of the reworkability improving agent is not particularly limited, and thus a known component in the art, for example, a fluorine compound, a silicon compound or a low molecular weight material, may be suitably used. In addition, a content of the reworkability improving agent is not particularly limited, either, and thus may be suitably selected in consideration of a desired property and components of a composition.

In addition, the composition may further include at least one or two additives selected from the group consisting of a thermosetting agent, a catalyst, a UV curing agent, a low molecular weight material, a silane coupling agent, a scattering agent, a UV stabilizer, a coloring agent, a reinforcing agent, a filler, a foaming agent, a surfactant and a plasticizer.

The present invention is also directed to a pressure-sensitive adhesive pad. The exemplary pressure-sensitive adhesive pad may have a pressure-sensitive adhesive layer including the pressure-sensitive adhesive composition in a cured state.

A specific method of forming the pressure-sensitive adhesive layer is not particularly limited. For example, when the pressure-sensitive adhesive composition is a thermosetting type, the pressure-sensitive adhesive layer may be formed by coating the composition using a means such as a knife coater or a comma coater, and performing heating, drying and/or aging processes. Alternatively, when the composition is a photocurable type, the pressure-sensitive adhesive layer may also be formed by coating the composition and curing the coated composition through light irradiation, for example, a UV irradiation process. Here, conditions for the heating, drying, aging and/or light irradiating processes are not particularly limited, and may be suitably set in consideration of the components of the composition.

The pressure-sensitive adhesive layer formed as described above may have a thickness of approximately 0.1 mm to 5 mm. As the thickness of the pressure-sensitive adhesive layer is controlled within the above range, the pressure-sensitive adhesive pad may effectively exhibit a desired property.

The pressure-sensitive adhesive pad may include a single layer of the above-described pressure-sensitive adhesive layer, or a multilayer structure formed by stacking at least two pressure-sensitive adhesive layers. In addition, when the pressure-sensitive adhesive layer has a multilayer structure, each pressure-sensitive adhesive layer may exhibit a different diffusing or scattering property by modulating a ratio of the scattering particle in each pressure-sensitive adhesive layer.

The pressure-sensitive adhesive pad may only include the pressure-sensitive adhesive layer, or have a releasing film or a different plastic film stacked on one or both surfaces of the pressure-sensitive adhesive layer. In this case, the thickness or kind of the releasing or plastic film is not particularly limited, and may be selected from a known category.

In one example, as shown in FIG. 1, the pressure-sensitive adhesive pad 1 may include a pressure-sensitive adhesive layer 11; and a polyester sheet 12 having roughness formed on one surface of the pressure-sensitive adhesive layer 11. While, in FIG. 1, the case in which the plastic sheet 12 is formed on one surface of the pressure-sensitive adhesive layer 11, the plastic sheet 12 may be formed on both surfaces of the pressure-sensitive adhesive layer 11. A specific kind of the plastic sheet is not particularly limited, and thus the plastic sheet may be a known sheet treated by roughening on one surface thereof. In one example, the plastic sheet may be a polyester sheet treated by roughening, for example, a poly(ethylene terephthalate) (PET) sheet treated by roughening. Here, the roughening may be performed by a conventional method such as sanding or bead coating. When such a sheet is used, the pad may be applied to an optical or lighting apparatus, and when the sheet is in contact with a different optical sheet, occurrence of light spot by welding between the sheets may be effectively prevented, and the process efficiency may also be obtained. In addition, as the light diffusing function is recovered by roughening, the plastic sheet may have a more improved light diffusing or scattering function of the pressure-sensitive adhesive pad. The roughening-treated plastic sheet may have a haze level of approximately 2 to 80%. Various methods of measuring the haze of the plastic sheet are known in the art. When the haze level of the plastic sheet is less than 2%, for example, when the pressure-sensitive adhesive pad is in contact with another film in an optical device, spots may occur, and when the haze level of the plastic sheet is more than 80%, due to a decrease in optical transmission, the light diffusing effect may not be effectively exhibited.

In another example, as shown in FIG. 2, the pressure-sensitive adhesive pad 2 may further include a plastic sheet 21 which is formed on one surface of a pressure-sensitive adhesive layer 11, and on which a light shielding pattern 22 is printed. When the sheet 21 having the light shielding pattern 22 is included and the pad is applied to an optical or lighting apparatus, a bright point defect caused by an illuminant included in the device when necessary may be effectively prevented. While, in FIG. 2, the plastic sheet 21 is formed on one surface of the pressure-sensitive adhesive layer 11, the plastic sheet 21 may be formed on both surfaces of the pressure-sensitive adhesive layer 11. In addition, the light shielding pattern 22 may be formed by a printing process using a conventional light shielding ink, and as the plastic sheet 21, a polyester sheet such as a PET sheet may be used, but the present invention is not limited thereto.

In another example, the pressure-sensitive adhesive pad 3, as shown in FIG. 3, may include a roughening-treated plastic sheet 12 formed on one surface of the pressure-sensitive adhesive layer 11 and a plastic sheet 21 on which the light shielding pattern 22 is printed and which is formed on the other surface of the pressure-sensitive adhesive layer 11.

The plastic sheet which is treated by roughening or has a printed light shielding pattern may have a thickness of approximately 5 to 300 µm. When the thickness of the sheet is controlled within the above-described range, a pad having excellent properties such as mechanical strength, light transmission and light diffusion may be provided.

The present invention is also directed to a light source for an optical or lighting apparatus. The exemplary light source for an optical or lighting apparatus may include the pressure-sensitive adhesive pad as a light diffusing member.

As the light source which may include the pressure-sensitive adhesive pad as a light diffusing member, a backlight unit (BLU) may be used. In one example, the pressure-sensitive adhesive pad may be a substitute for a light diffuser plate included in the unit.

FIGS. 4 and 5 show a BLU to which the pressure-sensitive adhesive pad is applied.

As shown in FIG. 4, a BLU 4 may include a printed circuit board (PCB) 34; an illuminant 33 such as a light emitting diode (LED) formed on the PCB 34; a light scattering layer 32 attached to the entire surfaces of the PCB 34 and the LED 33; and the pressure-sensitive adhesive pad 2 formed on the light scattering layer 32 from bottom to top. The pad 2, as shown in FIG. 4, may include a plastic sheet 21 having a light shielding pattern 22 on one surface, and bright point defects caused by the illuminant 33 may be reduced by printing the light shielding pattern 22 to correspond to the illuminant 33 of the BLU 4. In addition, here, the attachment of the light scattering layer 32 to the entire surfaces of the PCB 34 and the LED 33, as shown in FIG. 4, means the state in which an air gap is not substantially present between the substrate 34 and the LED 33, and the light scattering layer 32 since the light scattering layer 32 is attached to the entire surfaces of the substrate 34 and the LED 33.

As shown in FIG. 4, in the BLU 4, the light scattering layer 32 may be formed by a pressure-sensitive adhesive 321 mixed with scattering particles 322. Accordingly, as the light scattering layer 32 is effectively attached to the entire surfaces of the substrate 34 and the LED 33, the air gap may be substantially excluded, thereby minimizing loss of light emitted from the illuminant, that is, the LED 33, and providing a surface light source capable of more uniform light irradiation. Due to the structure, a step difference caused by the illuminant, that is, the LED, may be effectively overcome.

A method of forming the light scattering layer 32 is not particularly limited. For example, the light scattering layer 32 may be formed using the same composition as the pressure-sensitive adhesive composition by suitably modulating a mixing amount of the scattering particle according to its use.

As shown in FIG. 5, a BLU 5 may further include a brightness enhancement film (BEF) 41 formed on the pressure-sensitive adhesive pad 2; a dual BEF (DBEF) 42; a liquid crystal cell 44 having polarizing plates 43a and 43b attached to both surfaces thereof; and a substrate 45.

In this case, as shown in FIG. 5, the pad 3 may include a plastic sheet 12 having roughness on a side in contact with the BEF 41, and a plastic sheet 21 having the light shielding pattern 22 as described above on the side of the illuminant 33.

Specific kinds of the PCB, the LED, the BEF, the DBEF, the polarizing plate, the liquid crystal cell and the substrate used for the BLU are not particularly limited, and common elements in the art may be selected and adopted without limits.

BRIEF DESCRIPTION OF THE DRAWINGS

The above and other objects, features and advantages of the present invention will become more apparent to those of ordinary skill in the art by describing in detail exemplary embodiments thereof with reference to the adhered drawings, in which.

DETAILED DESCRIPTION OF EXEMPLARY EMBODIMENTS

Hereinafter, the pressure-sensitive adhesive composition will be described in detail with reference to Examples and Comparative Examples, but a category of the pressure-sensitive adhesive composition is not limited to the following Examples.

EXAMPLE 1

Preparation of First Pressure-Sensitive Adhesive Pad

A monomer mixture was prepared by mixing 75 parts by weight of ethylhexyl acrylate, 15 parts by weight of acrylic acid and 10 parts by weight of hydroxyethyl acrylate. As an initiator, a suitable amount of di(2-ethylhexyl) peroxydicarbonate (EHPDC) was added to the monomer mixture, and the mixture was bulk-polymerized to have a viscosity at 25° C. in a range of approximately 2,000 to 2,500 cps, thereby preparing a photocurable syrup. With respect to 100 parts by weight of the syrup, 0.7 parts by weight of a photoinitiator (2,4,6-trimethylbenzoyl diphenyl phosphine oxide, TPO), 0.3 parts by weight of 1,6-hexanediol diacrylate (HDDA), 15 parts by weight of scattering particles (refractive index: 1.59, average diameter: 4,000 nm, polystyrene-based beads, HR-59-40, Sunjin Chemicals Co., Ltd.) and 1 ppm of a dye (Blue dye, MACROLEX Blue RR Gran, Lanxess) were mixed, thereby preparing a pressure-sensitive adhesive composition. The prepared pressure-sensitive adhesive composition was coated on a PET sheet, and UV rays were irradiated as a light source for approximately 6 minutes under the state where a distance between a black light source and a layer of the coated pressure-sensitive adhesive composition was maintained at 15 cm, thereby preparing a pressure-sensitive adhesive layer, that is, a first pressure-sensitive adhesive pad, which had a thickness of 0.8 mm.

Preparation of BLU

Figure 1:
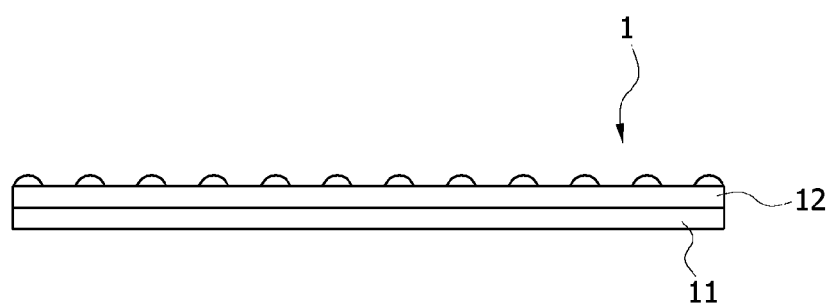
FIGS. 1 to 3 are cross-sectional views illustrating various examples of a pressure-sensitive adhesive pad.
Figure 2:
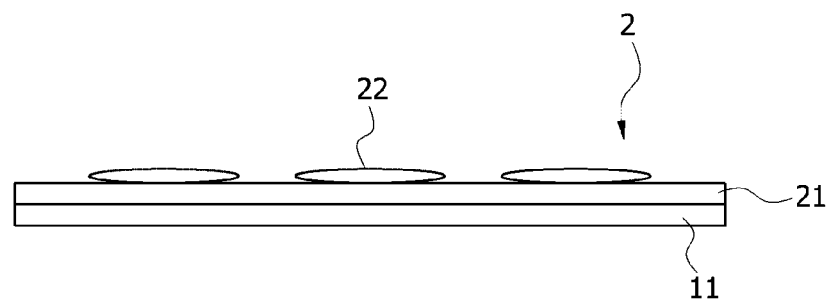
Figure 3:
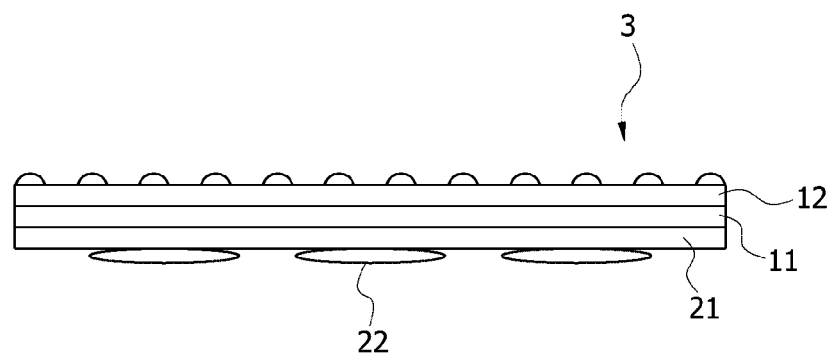
Figure 4:
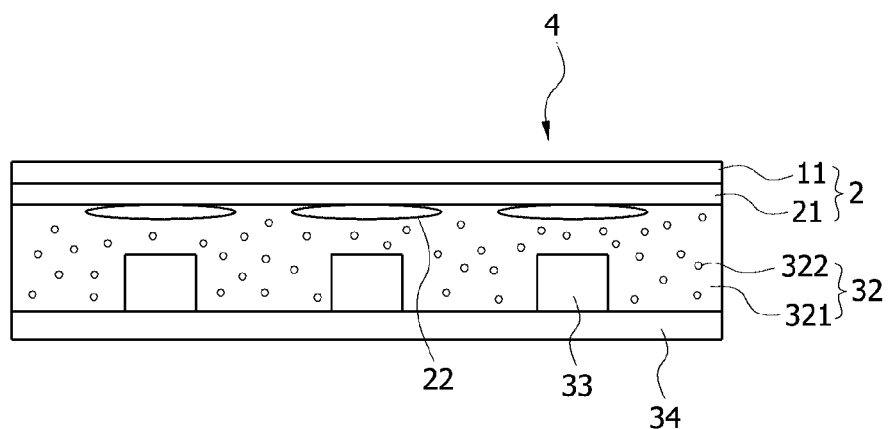
FIGS. 4 and 5 are diagrams illustrating a backlight unit.
Figure 5:
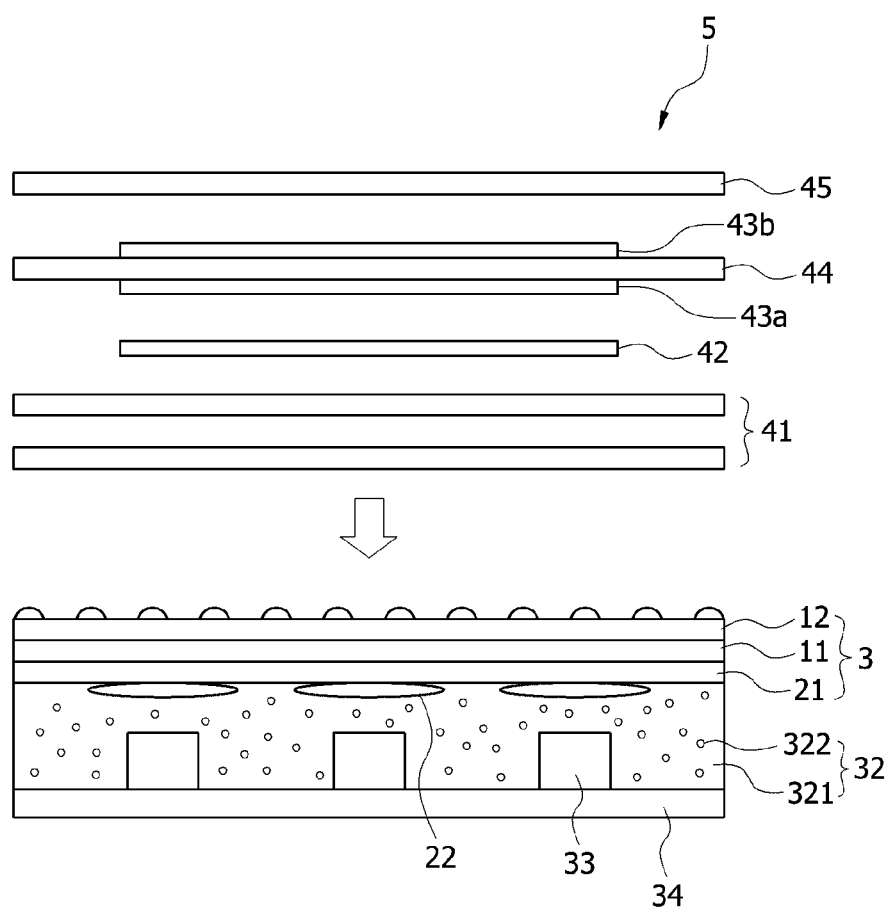

A pressure-sensitive adhesive pad 32 as shown in FIG. 4 was formed as a second pressure-sensitive adhesive pad on a PCB (PCB for 47-inch BLU, thickness: approximately 500 μm) on which an LED was arranged. Specifically, a pressure-sensitive adhesive composition which was the same as one used in the preparation of the pressure-sensitive adhesive layer of the first pressure-sensitive adhesive pad was prepared, but a ratio of a scattering particle 322 was changed to 0.01 parts by weight with respect to 100 parts by weight of syrup. The pressure-sensitive adhesive pad 32 having a thickness of approximately 1.45 mm was attached on the entire top surface of the PCB, thereby forming the second pressure-sensitive adhesive pad 32. Afterward, the prepared first pressure-sensitive adhesive pad was attached at a position of the pressure-sensitive adhesive pad 2 in FIG. 4, thereby preparing a light source.

EXAMPLE 2

A monomer mixture was prepared by mixing 70 parts by weight of ethylhexyl acrylate, 10 parts by weight of acrylic acid, 10 parts by weight of hydroxyethyl acrylate and 10 parts by weight of 2-(2-ethoxyethoxy)ethyl acrylate, and bulk polymerization was performed by the substantially same method as described in Example 1 to prepare a photocurable syrup. In the above, polymerization conditions were controlled for the syrup to have a viscosity at 25° C. in a range of approximately 3,000 to 3,500 cps. With respect to 100 parts by weight of the syrup, 0.7 parts by weight of a photoinitiator (2,4,6-trimethylbenzoyl diphenyl phosphine oxide, TPO), 0.2 parts by weight of 1,6-hexanediol diacrylate (HDDA), 15 parts by weight of scattering particles (refractive index: 1.59, average diameter: 4,000 nm, polystyrene-based beads, HR-59-40, Sunjin Chemicals Co., Ltd.) and 0.6 ppm of a dye (Blue dye, MACROLEX Blue RR Gran, Lanxess) were mixed, thereby preparing a pressure-sensitive adhesive composition. Afterward, a first pressure-sensitive adhesive pad having a pressure-sensitive adhesive layer 11 with a thickness of 0.8 mm was prepared by the same method as described in Example 1 using the pressure-sensitive adhesive composition. The prepared first pressure-sensitive adhesive pad was attached on the second pressure-sensitive adhesive pad, which was the same as the one used in Example 1, of a PCB, thereby preparing a light source.

EXAMPLE 3

A monomer mixture was prepared by mixing 60 parts by weight of ethylhexyl acrylate, 10 parts by weight of acrylic acid, 10 parts by weight of hydroxyethyl acrylate, 10 parts by weight of 2-(2-ethoxyethoxy)ethyl acrylate and 10 parts by weight of isobornyl acrylate, and bulk polymerization was performed by the substantially same method as described in Example 1 to prepare a photocurable syrup. In the above, polymerization conditions were controlled for the syrup to have a viscosity at 25° C. in a range of approximately 3,000 to 3,500 cps. With respect to 100 parts by weight of the syrup, 0.7 parts by weight of a photoinitiator (2,4,6-trimethylbenzoyl diphenyl phosphine oxide, TPO), 0.3 parts by weight of 1,6-hexanediol diacrylate (HDDA), 12.5 parts by weight of scattering particles (refractive index: 1.59, average diameter: approximately 3,000 to 4,000 nm, polystyrene-based bead, GS-0459S-6, Granz) and 1 ppm of a dye (Blue dye, MACROLEX Blue RR Gran, Lanxess) were mixed, thereby preparing a pressure-sensitive adhesive composition. Afterward, a first pressure-sensitive adhesive pad having a pressure-sensitive adhesive layer 11 with a thickness of 0.8 mm was prepared by the same method as described in Example 1 using the pressure-sensitive adhesive composition. The prepared first pressure-sensitive adhesive pad was attached on the second pressure-sensitive adhesive pad, which is the same as the one used in Example 1, of a PCB, thereby preparing a light source.

COMPARATIVE EXAMPLE 1

A monomer mixture was prepared by mixing 85 parts by weight of ethylhexyl acrylate, 10 parts by weight of acrylic acid and 5 parts by weight of hydroxyethyl acrylate, and bulk polymerization was performed by the substantially same method as described in Example 1 to prepare a photocurable syrup. In the above, polymerization conditions were controlled for the syrup to have a viscosity at 25° C. in a range of approximately 2,000 to 2,500 cps. With respect to 100 parts by weight of the syrup, 0.7 parts by weight of a photoinitiator (2,4,6-trimethylbenzoyl diphenyl phosphine oxide, TPO), 0.1 parts by weight of 1,6-hexanediol diacrylate (HDDA) and 15 parts by weight of scattering particles (refractive index: 1.59, average diameter: approximately 4 μm, polystyrene-based beads, HR-59-40, Sunjin Chemicals Co., Ltd.) were mixed, thereby preparing a pressure-sensitive adhesive composition. Afterward, a first pressure-sensitive adhesive pad having a pressure-sensitive adhesive layer 11 with a thickness of 0.8 mm was prepared by the same method as described in Example 1 using the pressure-sensitive adhesive composition, and a light source was prepared in the same manner as described above.

COMPARATIVE EXAMPLE 2

A monomer mixture was prepared by mixing 70 parts by weight of ethylhexyl acrylate and 30 parts by weight of isobornyl acrylate. A photocurable syrup was prepared by adding a suitable amount of di(2-ethylhexyl) peroxydicarbonate (EHPDC) as an initiator to the monomer mixture and performing bulk polymerization so as for the syrup to have a viscosity at 25° C. in a range of approximately 2,000 to 2,500 cps. With respect to 100 parts by weight of the syrup, 0.7 parts by weight of a photoinitiator (2,4,6-trimethylbenzoyl diphenyl phosphine oxide, TPO), 0.07 parts by weight of 1,6-hexanediol diacrylate (HDDA), 15 parts by weight of scattering particles (refractive index: 1.59, average diameter: 4,000 nm, polystyrene-based beads, HR-59-40, Sunjin Chemicals Co., Ltd), 0.3 parts by weight of an antioxidant (Songnox 2450Pw) and 1 ppm of a dye (Blue dye, MACROLEX Blue RR Gran, Lanxess) were mixed, thereby preparing a pressure-sensitive adhesive composition. Afterward, a first pressure-sensitive adhesive pad having a pressure-sensitive adhesive layer 11 with a thickness of 0.8 mm was prepared by coating the prepared pressure-sensitive adhesive composition on a PET sheet and irradiating UV rays from the light source for approximately 6 minutes under the state where a distance between the black light source and the coated layer of the pressure-sensitive adhesive composition was maintained at 15 cm, and a light source was prepared in the same manner as described in Example 1.

COMPARATIVE EXAMPLE 3

A monomer mixture was prepared by mixing 75 parts by weight of ethylhexyl acrylate, 10 parts by weight of isobornyl acrylate and 15 parts by weight of acrylic acid. A photocurable syrup capable of being cured by being irradiated with an active energy ray was prepared by adding a suitable amount of di(2-ethylhexyl) peroxydicarbonate (EHPDC) as an initiator to the monomer mixture and performing bulk polymerization so as for the syrup to have a viscosity at 25° C. in a range of approximately 2,000 to 2,500 cps. With respect to 100 parts by weight of the syrup, 0.7 parts by weight of a photoinitiator (2,4,6-trimethylbenzoyl diphenyl phosphine oxide, TPO), 0.1 parts by weight of 1,6-hexanediol diacrylate (HDDA), 0.15 parts by weight of an antioxidant (Songnox 2450Pw) and 15 parts by weight of scattering particles (refractive index: 1.59, average diameter: 4,000 nm, polystyrene-based beads, HR-59-40, Sunjin Chemicals Co., Ltd) were mixed, thereby preparing a pressure-sensitive adhesive composition. A first pressure-sensitive adhesive pad having a pressure-sensitive adhesive layer with a thickness of 0.8 mm was prepared by coating the prepared pressure-sensitive adhesive composition on a PET sheet and irradiating UV rays from the light source for approximately 6 minutes under the state where a distance between the black light source and the coated layer of the pressure-sensitive adhesive composition was maintained at 15 cm, and a light source was prepared in the same manner as described in Example 1.

COMPARATIVE EXAMPLE 4

A monomer mixture was prepared by mixing 73 parts by weight of ethylhexyl acrylate, 20 parts by weight of isobornyl acrylate and 7 parts by weight of hydroxyethyl acrylate. A photocurable syrup capable of being cured by being irradiated with an active energy ray was prepared by adding a suitable amount of di(2-ethylhexyl) peroxydicarbonate (EHPDC) as an initiator to the monomer mixture and performing bulk polymerization so as for the syrup to have a viscosity at 25° C. in a range of approximately 2,000 to 2,500 cps. With respect to 100 parts by weight of the syrup, 1 part by weight of a photoinitiator (2,4,6-trimethylbenzoyl diphenyl phosphine oxide, TPO), 0.5 parts by weight of 1,6-hexanediol diacrylate (HDDA), 0.2 parts by weight of an antioxidant (Songnox 2450Pw) and 15 parts by weight of scattering particles (refractive index: 1.59, average diameter: 4,000 nm, polystyrene-based beads, HR-59-40, Sunjin Chemicals Co., Ltd) were mixed, thereby preparing a pressure-sensitive adhesive composition. A first pressure-sensitive adhesive pad having a pressure-sensitive adhesive layer with a thickness of 0.8 mm was prepared by coating the prepared pressure-sensitive adhesive composition on a PET sheet and irradiating UV rays from the light source for approximately 6 minutes under the state where a distance between the black light source and the coated layer of the pressure-sensitive adhesive composition was maintained at 15 cm, and a light source was prepared in the same manner as described in Example 1.

EXPERIMENTAL EXAMPLE 1

Durability Test

Heat-resistant durability and humidity/heat-resistant durability were evaluated with respect to each of the light sources prepared in Examples and Comparative Examples (samples) (each having a width of 10 cm and a length of 30 cm). The heat-resistant durability was evaluated by leaving the sample at 80° C. for 240 hours and observing the generation of bubbles, and the occurrence of lift-off and peeling with the naked eyes, and the humidity/heat-resistant durability was evaluated by leaving the sample at 60° C. and a relative humidity of 90% for 240 hours and observing the generation of bubbles, and the occurrence of lift-off and peeling with the naked eyes. Criteria for each evaluation were as follows.

<Evaluation for Generation of Bubbles>

○: In case where no bubbles were generated in the pressure-sensitive adhesive and at an interface, or where bubbles could not be observed with the naked eyes since they had an excessively small size ×: In case where a single bubble or a group of bubbles was observed with the naked eyes in the pressure-sensitive adhesive and/or at an interface <Evaluation of Lift-off and Peeling>

○: In case where neither lift-off nor peeling occurred at an interface between the pressure-sensitive adhesive and the adherent ×: In case where lift-off, partial peeling or complete peeling occurred at an interface between the pressure-sensitive adhesive and the adherent

EXPERIMENTAL EXAMPLE 2

Evaluation of Curling Property

The samples used in Experimental Example 1 were left under a heat resistant condition, and then whether curling occurred or not was evaluated. Specifically, the samples were left standing in a vertical direction at 80° C. for 240 hours, and slowly cooled at room temperature for approximately 30 minutes. Afterward, the samples standing in a vertical direction were disposed to face and be in contact with a flat glass substrate, and the longest distance between the glass substrate, which was the reference, and the sample was measured by a tape measurer, thereby evaluating the occurrence of curling.

The measurement results are summarized and listed in Table 1.

TABLE 1

|  |  |  | Examples | | | Comparative Examples | | | |
|---|---|---|---|---|---|---|---|---|---|
|  |  |  | 1 | 2 | 3 | 1 | 2 | 3 | 4 |
| Durability Test | Bubbles | Heat Resistance Test | ○ | ○ | ○ | ○ | × | ○ | × |
|  |  | Humidity/Heat Resistance Test | ○ | ○ | ○ | ○ | × | ○ | × |
|  | Lift-Off/Peeling | Heat Resistance Test | ○ | ○ | ○ | ○ | × | × | × |
|  |  | Humidity/Heat Resistance Test | ○ | ○ | ○ | ○ | × | × | × |
| Curling Test (cm) |  |  | ○ | ○ | ○ | ○ | — | — | — |

From the results of Table 1, it is confirmed that the light sources having the excellent durability and curling properties were obtained in Examples. However, in Comparative Examples 2 and 4, bubbles were excessively generated after the humidity/heat resistance test and thus a haze was observed. In addition, in Comparative Examples 2 to 4, the pressure-sensitive adhesive layer was peeled off during the heat or humidity/heat resistance test, and thus the curling property could not be evaluated.

EXPERIMENTAL EXAMPLE 3

Measurement of Optical Property

To evaluate the optical property of the pressure-sensitive adhesive according to the presence or absence of a dye, b* and YI on the CIE coordinate system for the pressure-sensitive adhesives in Examples 1 to 3 and Comparative Example 1 were evaluated, and the results are listed in the following Table 2. In Table 2, the reference value (Ref) is a value for a diffuser plate produced by Kolon, which is generally used in BLUs.

<Measurement of CIE Color Coordinate System and YI>

Right after the preparation of the pressure-sensitive adhesive layers, the prepared pressure-sensitive adhesives were left in an oven at 80° C. for 240 hours (heat resistance test) and left at 60° C. and a relative humidity of 90% for 240 hours (humidity/heat resistance test), L*, a*, b*, x and y values and YI on the CIE color coordinate system for the pressure-sensitive adhesive layers prepared in Examples 1 to 3 and Comparative Example 1 were measured using a measurer (UV-vis-NIR Spectrophotometer (SolidSpec-3700, Shimadzu)) (In Table 2, the values for the pressure-sensitive adhesive measured right after the preparation are listed.)

TABLE 2

|  |  | Ref* | Examples | | | *C. Example |
|---|---|---|---|---|---|---|
|  |  |  | 1 | 2 | 3 | 1 |
| CIE Coordinate system | L* | 64.31 | 66.82 | 65.86 | 64.20 | 66.41 |
|  | a* | −0.45 | −0.54 | −0.47 | −0.45 | −0.37 |
|  | b* | 2.49 | 2.29 | 2.42 | 2.49 | 3.16 |
|  | x* | 0.3154 | 0.3147 | 0.3152 | 0.3154 | 0.3171 |
|  | y* | 0.3230 | 0.3223 | 0.3227 | 0.3230 | 0.3244 |
| Yellowness Index |  | 6.32 | 5.58 | 6.05 | 6.32 | 7.98 |

*Ref indicates an optical property of the diffuser plate produced by Kolon.
*C. Example: Comparative Example As seen from Table 2, it is confirmed that, in the case of the pressure-sensitive adhesive pads in Examples 1 to 3, b* and YI equal to the diffuser plate currently applied to BLUs were shown, and the ranges were maintained after the heat resistance and humidity/heat resistance tests and thus the pressure-sensitive adhesive pads were suitable for an optical use. However, in Comparative Example 1 which did not include a dye, excessively high b* and YI values were measured, and these values mean that significant yellowing was shown in the pressure-sensitive adhesive, and thus the application of the pressure-sensitive adhesive to an optical use is highly limited.

An exemplary pressure-sensitive adhesive composition of the present invention can be applied to various optical and lighting devices as a light diffusing material. Since the pressure-sensitive adhesive composition is used as a light diffusing material, the curling or bubble generation does not occur under a high temperature or high temperature and humidity condition. In addition, since the pressure-sensitive adhesive composition can be applied to an optical or lighting apparatus in a form of a pressure-sensitive adhesive pad, an air gap is removed or reduced from the device and thus light loss can be minimized. In addition, another optical material such as a prism sheet can also be attached to a device without using a separate pressure-sensitive adhesive, and effective in configuration of a flexible device. The pressure-sensitive adhesive composition cannot cause whitening or yellowing after being applied to an optical or lighting apparatus, and an excellent optical property can be stably maintained for a long time.

What is claimed is:

1. A pressure-sensitive adhesive composition, comprising:
   a photocurable syrup which comprises:
   monomer components that comprise a linear or branched alkyl (meth)acrylate;
   (meth)acrylic acid; and
   a compound of any one of Formulas 1 to 3; or
   a polymer component that comprises the monomer components as a polymerization unit; and
   a blue dye,
   wherein, in the photocurable syrup, the linear or branched alkyl (meth)acrylate is included in an amount of 55 to 75 parts by weight of the photocurable syrup, the (meth)acrylic acid is included in an amount of 1 to 15 parts by weight of the photocurable syrup, the compound of any one of Formulas 1 to 3 is included in an amount of 5 to 30 parts by weight of the photocurable syrup:

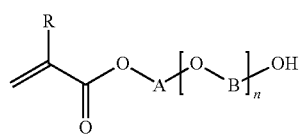

[Formula 1]

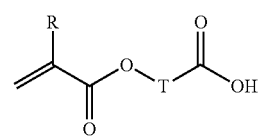

[Formula 2]

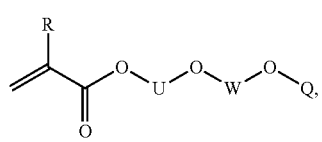

[Formula 3]

wherein R is hydrogen or an alkyl group, A, B, T, U and W are each independently an alkylene or alkylidene group, Q is an alkyl group or aryl group, and n is a number of 0 to 5, and wherein the pressure-sensitive adhesive composition has a "b*" value on a CIE coordinate system of −2 to 3 and a yellow index (YI) value of −8.0 to 7.5 after being cured.

2. The composition according to claim 1, wherein the monomer components further comprises a compound of Formula 4:

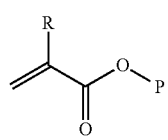

[Formula 4]

wherein R is hydrogen or an alkyl group, and P is a monovalent moiety derived from an aliphatic saturated cyclic hydrocarbon compound.

3. The composition according to claim 1, wherein the monomer components or the polymer component is a partially polymerized product of a mixture comprising a linear or branched alkyl (meth)acrylate; (meth)acrylic acid; and the compound of any one of the Formulas 1 to 3.

4. The composition according to claim 1, wherein the "b*" value on the CIE coordinate system is from −1 to 3 after being cured.

5. The composition according to claim 1, wherein the YI value is from 0 to 7.5 after being cured.

6. The composition according to claim 1, wherein the monomer or polymer component has a viscosity at 25° C. of 1,500 to 4,000 cps.

7. The composition according to claim 1, further comprising a particle having a difference in refractive index with the pressure-sensitive adhesive of 0.05 to 1.0.

8. The composition according to claim 7, wherein the particle is an acrylic resin particle, a styrene resin particle, a urethane resin particle, a melamine resin particle, a benzoguanamine resin particle, an epoxy resin particle, a silicon resin particle, a silica particle, a titanium dioxide particle, a magnesium fluoride particle, a zirconium oxide particle, an aluminum oxide particle or a glass particle.

9. The composition according to claim 1, further comprising a photoinitiator.

10. The composition according to claim 1, further comprising an antioxidant or a reworkability improving agent.

11. A pressure-sensitive adhesive pad comprising a pressure-sensitive adhesive layer that comprises the pressure-sensitive adhesive composition of claim 1 in a cured state.

12. The pad according to claim 11, further comprising a plastic sheet treated by roughening or a plastic sheet having printed light shielding patterns, the plastic sheet being formed on one or both surfaces of the pressure-sensitive adhesive layer.

13. A light source for an optical or lighting apparatus comprising the pressure-sensitive adhesive pad of claim 11 as a light diffusing member.

* * * * *